July 17, 1956

J. NOALL

2,755,028

APPARATUS FOR HANDLING SHEET MATERIAL

Filed Oct. 18, 1951

July 17, 1956          J. NOALL          2,755,028

APPARATUS FOR HANDLING SHEET MATERIAL

Filed Oct. 18, 1951          8 Sheets-Sheet 3

Inventor
John Noall
By Ely & Lrye
Attorneys

2,755,028

APPARATUS FOR HANDLING SHEET MATERIAL

John Noall, Cuyahoga Falls, Ohio, assignor to The Firestone Tire & Rubber Company, Akron, Ohio, a corporation of Ohio Application October 18, 1951, Serial No. 251,885

1 Claim. (Cl. 242—55)

This invention relates to the handling of sheet material and more particularly to means for handling tire ply material from the time it is manufactured until it is assembled in a tire.

In the manufacture of tires, the body of a tire is built up from superimposed layers of rubber-covered fabric called plies. The ply stock is essentially weftless fabric, usually of cotton, rayon or nylon, which is cut and spliced in such a manner as to produce continuous strips of material in which the threads or strands are disposed at an angle, the so-called bias angle, to the length thereof. The fabric is coated on both sides with a thin layer of somewhat tacky rubber so that the plies will stick together when forced into contact with each other.

It will be appreciated that such ply material presents a problem of handling involving many difficulties. The fabric cannot be distorted, else the bias angle will vary over a considerable range, and the tires made from such stock will be of inferior quality. The ply stock must be stored and handled in a manner to prevent "blocking," that is, to prevent adjacent layers from sticking together. Care must be exercised to preserve the quality of the rubber, to prevent aging and to prevent the absorption of water by the fabric. The ply stock must be kept clean and protected from mechanical damage. All of these aspects of the problem have been recognized for many years. The problem is admittedly one of long standing in the rubber industry.

Heretofore, ply stock has been handled, from the time the rubber is added to the fabric at the calender until it is delivered to the tire building machine, in large rolls of coarse cotton twill called liner rolls. The ply stock is rolled up with the liner material to lie between the convolutions of liner and in this manner tends to be protected against most of the damage to which it would otherwise be subjected. The liner rolls are provided with large wooden hollow cores called shells through which removable square bars may be inserted to act as spindles. The rolls and bars are adapted to be supported by various frames, such as the so-called A-frames, which are located throughout the plant, to enable the liner rolls to be wound up while being loaded with ply stock, to be unwound for removing the ply stock or to be stored until needed in the manufacturing operations. The A-frames are relatively crude upright stands having pairs of spaced hooks to receive the ends of the square bars of the liner rolls. Various means are employed to wind and unwind the liner rolls as they are thus supported. In some instances the liner roll itself is frictionally engaged by driven roller means to give it the desired rotation; in others, the liner is unwound manually, as by the operator at a tire building machine; but in every case the equipment (bars, shells, and frames) for winding and unwinding is loosely assembled, so that accuracy of winding and unwinding is impossible.

Such apparatus requires repeated assembly of shells, shell bars and A-frames at many points throughout the plant; and the liner must be secured to a new shell for rewinding whenever ply stock is to be loaded into a liner roll or delivered therefrom. The labor involved in these operations makes this method of handling ply stock costly and time consuming. Another objection is that the liner rolls necessarily have loose ends which tend to unwind, to fray and tear and to become dirty and ragged. As a result the ends must frequently be trimmed from the rolls and discarded. The body of the liner also is subject to damage, because the shells and frames do not protect it in use and as a result the liner must be continually inspected; minor cuts and tears must be repaired; and areas of major damage must be replaced. Liners frequently must be spliced in order to provide working lengths. The liners must be frequently cleaned. The life of a liner is, therefore, relatively short and for this reason liners of the best material cannot be economically used. The cost of liner material is thus not insignificant in the total cost of tire manufacturing.

Another objection to the former equipment results from the failure of liner rolls to wind, and hence unwind, accurately and uniformly. A common fault is "coning," the term applied to rolls which have their ends shifted to assume a conical shape. Another fault is unevenness in winding pressure, the liner often being wound so loosely as to assume an exaggerated oval shape in cross-section. Even without these faults the liner tends to shift laterally back and forth as it is wound and unwound, making it impossible for the liner rolls to deliver tire ply stock accurately to the tire building machine. Moreover, with the use of such rolls it is necessary that the operator of the tire building machine exert a substantial pull on the tire ply stock to remove it from the liner, thereby distorting the ply stock and making it difficult to obtain a uniform fabric bias angle in the tire.

The objections to and disadvantages of the prior methods and apparatus have been set out at some length in order that the problem will be fully defined and the invention which solves this problem fully appreciated.

The present invention replaces the above described method of handling tire ply stock by providing a unit comprising a pair of fixed reels which are permanently assembled within and supported by a strong, rigid frame and housing. The reels have a substantial length of liner material stored thereon with the ends of the liner permanently secured to the two reels respectively. The liner material is transferred from one reel to the other by unwinding from one reel and winding up on the other and the unit has an accuracy and precision of construction which ensures that the liner will always wind accurately on the reels. When the reels are driven in one direction, ply stock may be laid upon the liner and drawn continuously into the unit, and when they are driven in the other direction the liner material will discharge the ply stock from the unit to further processing apparatus, such as, for example a tire building machine. Such a unit enables ply stock to be stored and handled without damage either to the liner material or the ply stock. The housing of the unit protects the liner material and the ply stock from mechanical damage and keeps both materials clean while the unit is transported and stored. The unit thus acts both as a protective package and as a portable conveyor or delivery means.

The primary object of the invention is to avoid the disadvantages of the present method of handling ply stock by discarding the use of shells, liner bars, etc., and the system of handling ply stock built up around such apparatus and substituting equipment which functions both as a protective housing for liner and ply stock and as a conveyor and delivery means for ply stock.

A more specific object is to provide an assembly of reels having a liner secured thereto which will store ply stock and deliver it without distortion to apparatus for further processing or treatment.

Another object is to provide means for handling sheet material in which both the liner and tire ply stock contained therein is protected from damage during handling.

Another object is to provide units for holding tire plies which are strong and rigid enabling the units to be stored in tiers for convenient handling by industrial trucks.

Another object is to provide means for handling ply stock which will deliver the stock accurately to tire building machines, eliminating the need for guides and the necessity of an operator pulling on the ply stock.

Another object is to provide means for storing tire ply stock which will protect the stock against dirt and mechanical damage and which will minimize the absorption of moisture by the cords of the fabric through their ends which are exposed at the edges of stock.

Further objects and advantages will more fully appear from the following description of a preferred form of the invention, reference being had to the accompanying drawings in which.

A preferred form of invention as mentioned above comprises a portable unit, indicated generally at 20, comprising a pair of reels or spools 21 and 22 assembled within and supported by a strong, rigid housing 23, the reels having a substantial length of liner 24 stored thereon with the ends of the liner permanently secured respectively to the reels. The liner is transferred from one reel to the other by unwinding from one reel and winding up on the other, and ply stock or other sheet material is stored within the unit within the convolutions of the liner or delivered from the unit as this transfer is made.

The unit has a precision of construction which ensures that the liner material will always unroll and wind up accurately on the reel, enabling the ply stock to be stored and handled without damage either to the liner or to the ply stock. The housing of the unit protects the liner and the ply stock from mechanical damage and keeps both liner and ply stock clean while the unit is transported and stored. The unit thus acts both as a protective package and as a portable conveyor or delivery means. When the reels are driven, the liner will discharge the ply stock from the unit to further processing apparatus such as, for example, a tire building machine, in a manner which preserves the quality of the ply stock.

Figures 1, 1A:
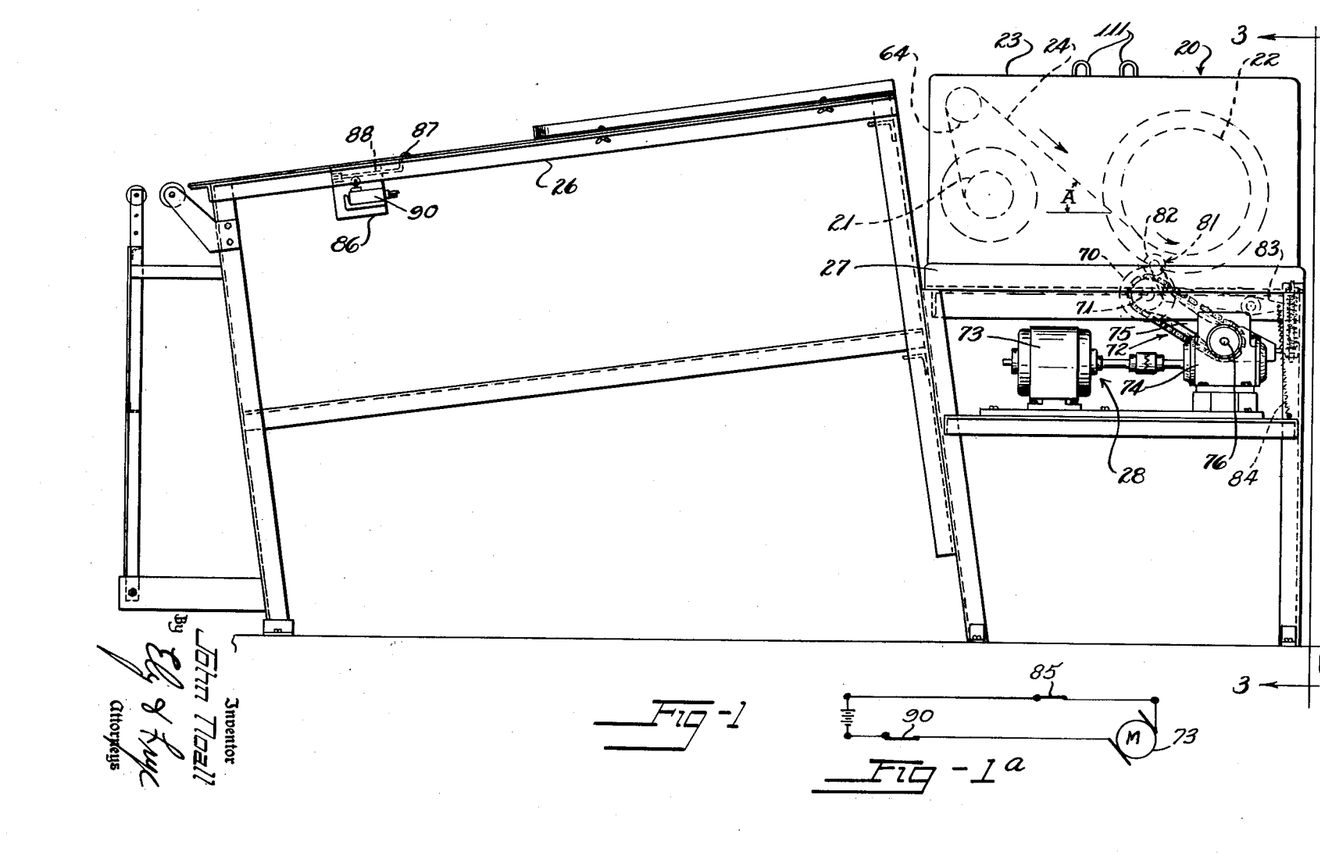
Figure 1 is a side elevation showing a unit embodying the invention in position to receive spliced fabric tire plies from a splicing table, immediately after leaving a bias cutter.
Figure 1a is a schematic electrical diagram showing the limit switches, motor and power source.

The unit is shown in Figure 1 in position to receive spliced tire ply material 25 from the loading table 26. The tire ply stock at this point has just been cut to the desired bias angle and spliced to continuous lengths. From the splicer it moves over the loading table 26 to be taken up by the unit 20 which is supported adjacent the end of the loading table by the supporting platform 27. The unit is driven for loading by driving mechanism associated with the platform and loading table and indicated generally at 28, the mechanism being controlled, as will be described later, by means which are separately responsive to the presence of ply stock upon the loading table and to the remaining unused capacity of the reel being loaded.

In the loading of the unit with ply stock, substantially all of the liner initially is wound on reel 21 and then as it is transferred by winding onto reel 22, the ply stock is fed onto the liner in the manner shown in Figure 1 so that at the end of the loading operation reel 22 holds the liner with the ply stock enclosed in the convolutions thereof. For convenience, reel 21 will be referred to as the liner reel and reel 22 will be referred to as the liner reel and reel 22 will be referred to as the ply stock or fabric reel. The manner in which the reels are driven for the loading and unloading operations will be described in detail later.

Figure 5:
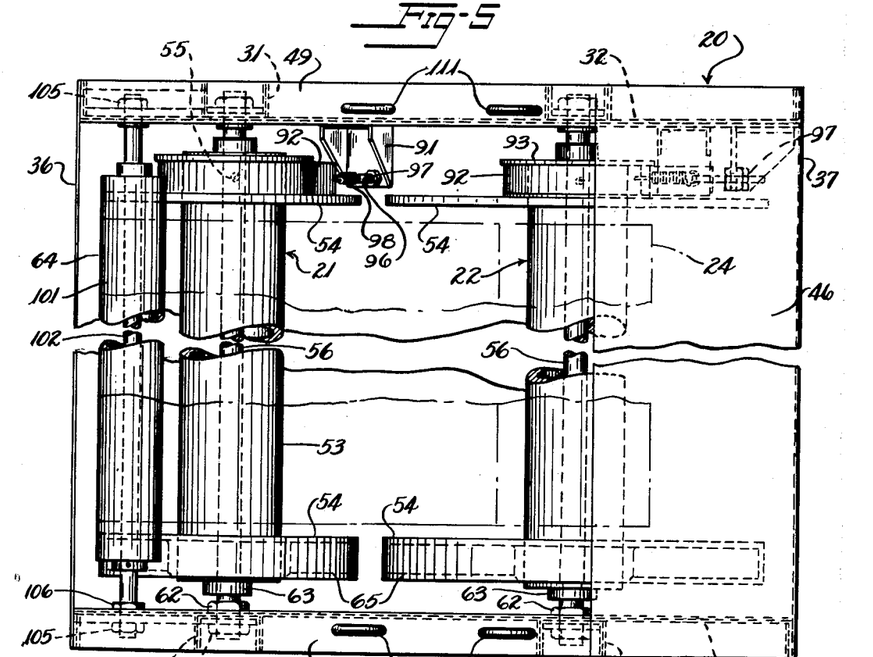
Figure 5 is a top plan view of a unit embodying the invention.
Figure 6:
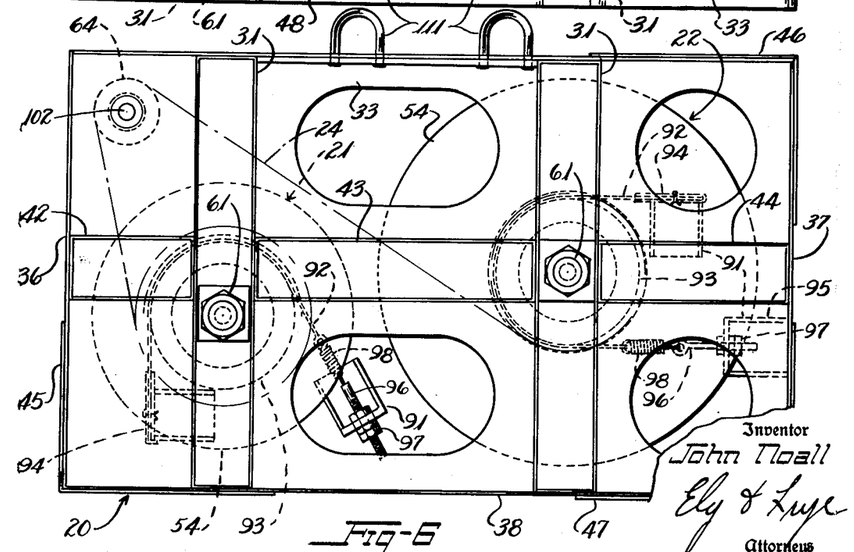
Figure 6 is a side elevation of the apparatus of Figure 5.
Figure 7:
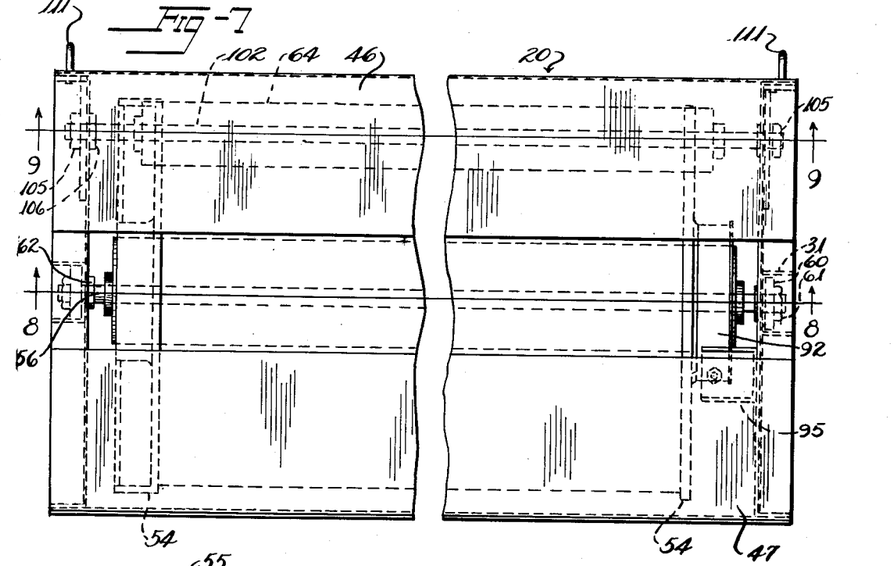
Figure 7 is an end elevation of the apparatus of Figures 5 and 6.

The unit 20 is of rigid and strong construction and is intended to withstand the hard service to which it is subjected so that the operation of the reels, that is, the winding and unwinding of the liner as it is transferred from one reel to the other, will remain true and accurate. As best shown in Figures 5 and 6, the unit 20 takes the form of an open box consisting of the vertical frame members 31 in the form of channel members which support the side plates 32 and 33. End plates 36 and 37 and the bottom plate 38 complete the basic housing and give it its box-like form. The box is reinforced by the channel members 42, 43 and 44, respectively, which extend longitudinally of the box within and at about the center of the sides, see Figure 6. As desired, various supplemental reinforcing members such as the angled corner members 45, 46 and 47 may be provided to give additional strength and rigidity to the frame and housing. It will be noted that the vertical channels 31 and the longitudinal channels 42—44 are disposed to give the maximum support to the reels, the channels intersecting immediately adjacent the points of shaft support for the reels. The top plates 48 and 49 complete the box construction.

Figure 8:
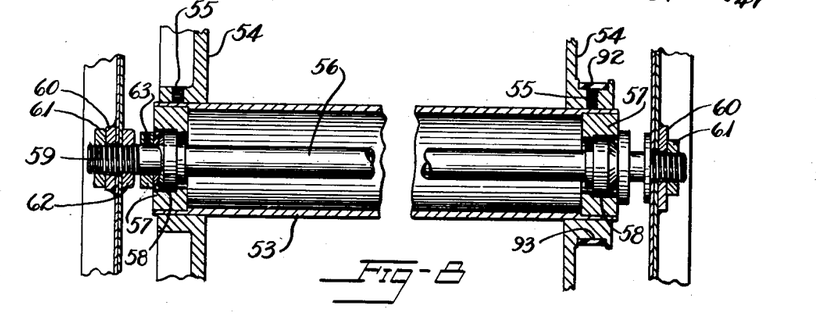
Figure 8 is a lateral sectional view of the unit of Figures 5–7 taken in the plane indicated by lines 8—8 of Figure 7 showing the construction of one of the reels of the unit.

The reels 21 and 22 are similar in construction and will be described with the same reference numerals indicating like parts. Each comprises a hollow tubular core member 53 having end flanges 54 secured thereto as by the set-screw and flange construction indicated at 55, see Figures 5 and 8. The cores 53 are supported for rotation on fixed shafts 56 by hub members 57 journalled on bearing members 58 fixedly mounted on the shafts 56. The shafts 56 are secured to the frame in any suitable manner such as the construction illustrated in Figure 8 in which the ends of the shaft are threaded as at 59 to engage the threaded bosses 60 secured to the side walls of the frame, the shafts being secured by the lock nuts 61 and 62. It will be noted that the bearing members are secured to the shaft by set screws indicated at 63.

Reverting to Figure 1, it will be seen that as the unit receives spliced tire ply material from the loading table, the fabric reel is driven in a counter-clockwise direction and is pulling liner material from the liner reel 21, the liner passing upward from the liner reel over an auxiliary idling roll 64 and thence diagonally downward to the fabric reel. The liner length which stretches between the reels is thus disposed at a convenient angle to receive the ply stock. In this operation the liner reel 21 has an idling clockwise rotation imparted by the movement of the liner as it is pulled from the reel. By this manner of handling, the ply stock is taken up by the liner without distortion of the ply stock, and both the liner material and the ply stock are wound upon reel 22 in an accurate and tight roll. When only a short length of liner material remains on the liner reel, the loading operation is terminated, care being taken that no ply stock is exposed on that portion of liner stretching from the auxiliary roll 64 to the fabric reel by winding several empty turns of liner on the fabric reel to insure full protection of the ply stock.

Figure 4:
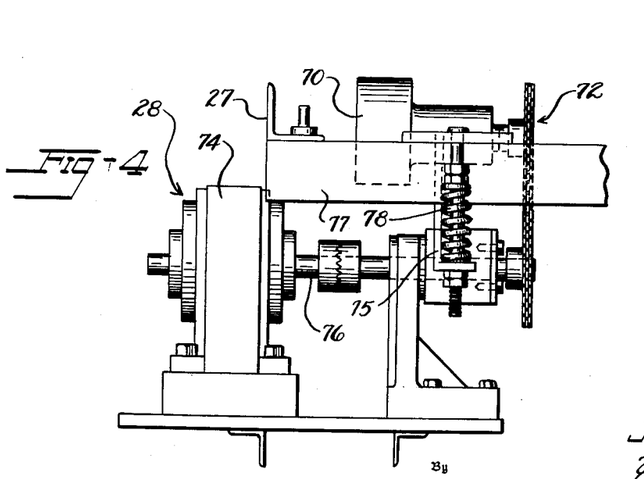
Figure 4 is a fragmentary enlarged view showing the driving mechanism of Figure 3.

The reels 21 and 22 are preferably rotated by frictional drive means which engage driving drums integral with the reels. Thus, as shown in Figure 5, one of each pair of flanges 54 of the two reels is supplied with a drum-like extension having a peripheral face 65 of considerable area. Suitable drive means are provided to drive the reels by engaging these drum surfaces. As best shown in Figures 1 and 4, the drive means comprises a driving roll 70 which is adapted to engage the drum face 65 of reel 22 and drive it by frictional contact therewith. The roll 70 is journalled on a shaft 71 and is driven by a chain and sprocket arrangement 72 which receives its power from a motor 73 through speed reducer 74. The roll shaft 71 is journalled on an arm 75 which is pivoted at 76 to a supporting frame 77. A spring 78 connected to the arm urges the driving roll upward through an aperture in the bottom of the unit into driving contact with the drum.

In order to prevent the driven reel, in this case the fabric reel, from overrunning and tearing the liner free of the liner reel, the driving apparatus also includes a control gauge 81 which measures the diameter of the material being wound upon the reel 22 and terminates the application of power to the reel when the diameter reaches a predetermined size. Control gauge 81 preferably takes the form of a small idler roll 82 mounted on a pivotal arm 83 and urged into contact with the liner by a coil spring 84. When the liner diameter reaches the desired maximum size, the arm 83 will operate a limit switch 85 to stop the electric motor 73.

Figure 2:
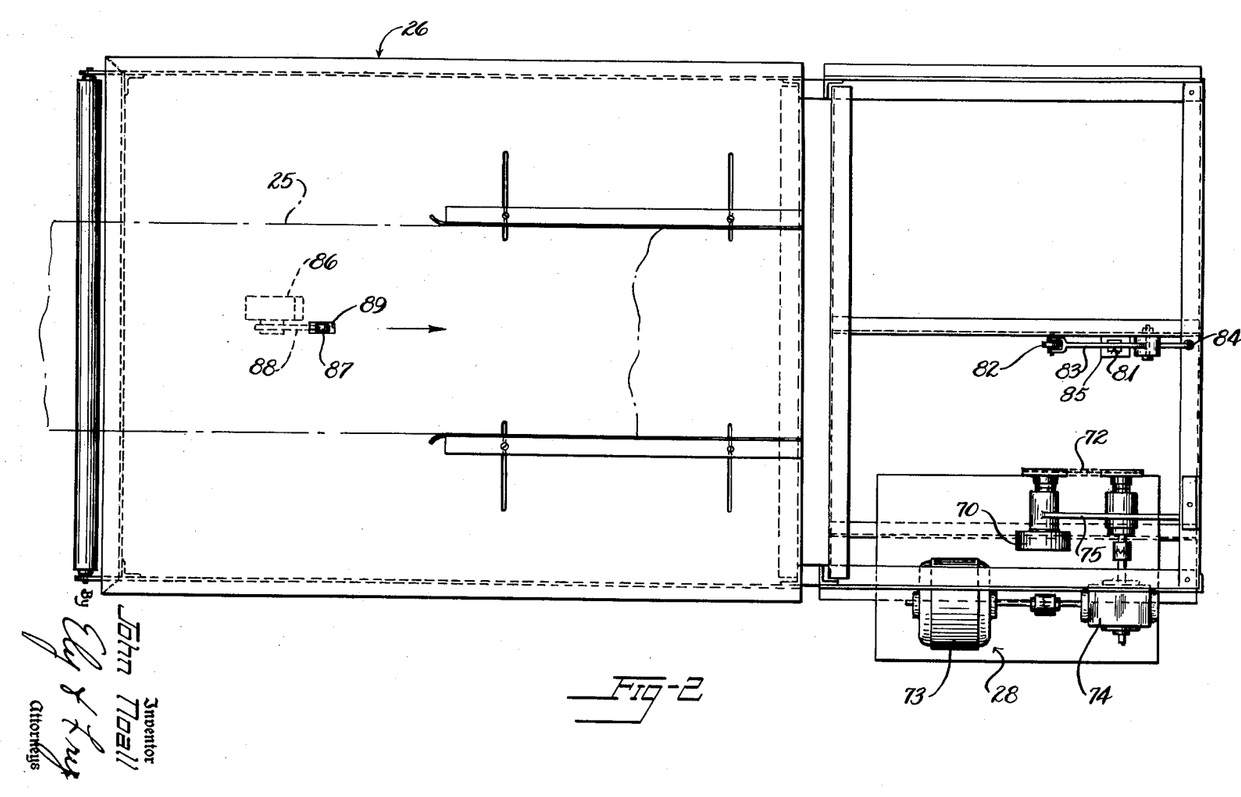
Figure 2 is a top plan of the assembly of Figure 1 with the unit removed to show more clearly the driving means therefor.
Figure 3:
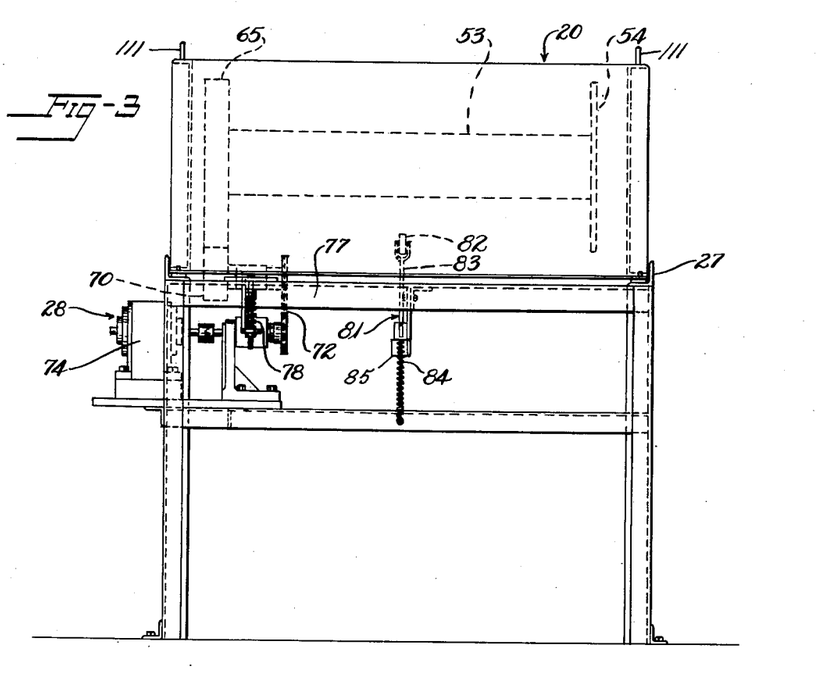
Figure 3 is an end elevation of the apparatus of Figures 1 and 2.

Means are also provided to insure that the ply stock material will be loaded into the unit continuously, with the loading operation being interrupted if the supply of ply stock should be interrupted. Such means is shown in Figure 2 as a feeler gauge 86, similar to the control gauge 81, the gauge 86 taking the form of a small roll 87 mounted on a pivotal arm 88 which extends upward through an aperture 89 in the loading table to engage the ply stock as it passes over the table into the unit. The weight of the ply stock normally keeps the roll 87 and arm 88 in a depressed position; but if for any reason the supply of ply stock should be interrupted, the roll will move upwardly and its arm will operate a limit switch 90 to cut off the supply of current to the electric motor 73 and stop the rotation of the reels.

In order to prevent overrunning of the reels in their idling rotation, the reels 21 and 22 are provided with substantially identical snubbing means 91, each comprising a strap 92 which passes over the annular flange 93 of the reel, the strap being secured at one end to the frame at 94 and being secured at the other end to a bracket 95 by an eye bolt 96 and nuts 97. A tension spring 98 connecting the eye bolt and the strap tightens the strap on the flange to cause it to impose the desired restraint upon the reels. The snubbing means for the liner reel 21 is essentially indentical to that for reel 22 and like reference characters indicate like parts, the only difference being in the disposition of the brackets by which they are secured to the frame, see Figure 6.

Figure 9:
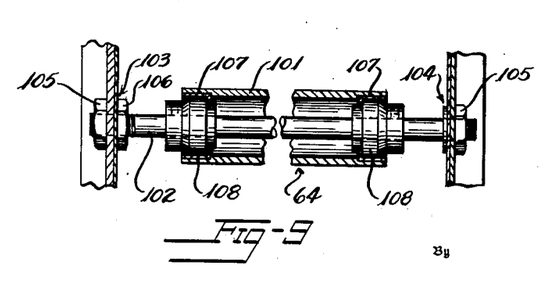
Figure 9 is a sectional view of the unit of Figures 5–7 taken in the plane indicated by lines 9—9 of Figure 7 showing the construction of the idler roll which facilitates the feeding and delivery of ply stock to and from the unit.

The auxiliary roll 64, referred to above and which will be referred to hereafter as the delivery roll, is an idler roll positioned above the liner reel to facilitate loading and especially unloading of the ply stock into and from the unit. The roll comprises a hollow cylindrical body member 101 supported on a fixed shaft 102 which is threadedly secured to the frame of the unit as at 103 and 104 and locked thereto by the nuts 105—106. The cylindrical body member has the flanged bearing rings 107 pressed into its ends which are journalled on the bearing members 108 secured to the shaft 102 in any suitable manner. The clearances are such as to provide a loose running fit between the bearing surfaces so that the roll will rotate freely as the liner passes over it. In some instances it may be advantageous to mount the roll on swinging arms (not shown) so that the ply stock can be delivered from the unit and presented to the tire building drum in the most effective manner.

It will be noted that the liner passes over the delivery roll 64 when it is transferred from one reel to the other and that the roll positions the liner at an angle indicated at A to facilitate the depositing of the ply stock onto the liner. When the ply stock is removed from the unit, the small diameter of the roll breaks the liner sharply down and away from the ply stock and causes the stock to peel cleanly away from the liner.

For convenience in handling, the unit is provided with hooks 111 which are secured by suitable means to the top plates 48 and 49 of the unit, and the bottom of each unit is suitably apertured so that when the units are stacked one above the other, the hooks 111 will extend upwardly into the apertures and permit the units to nest together.

Figure 10:
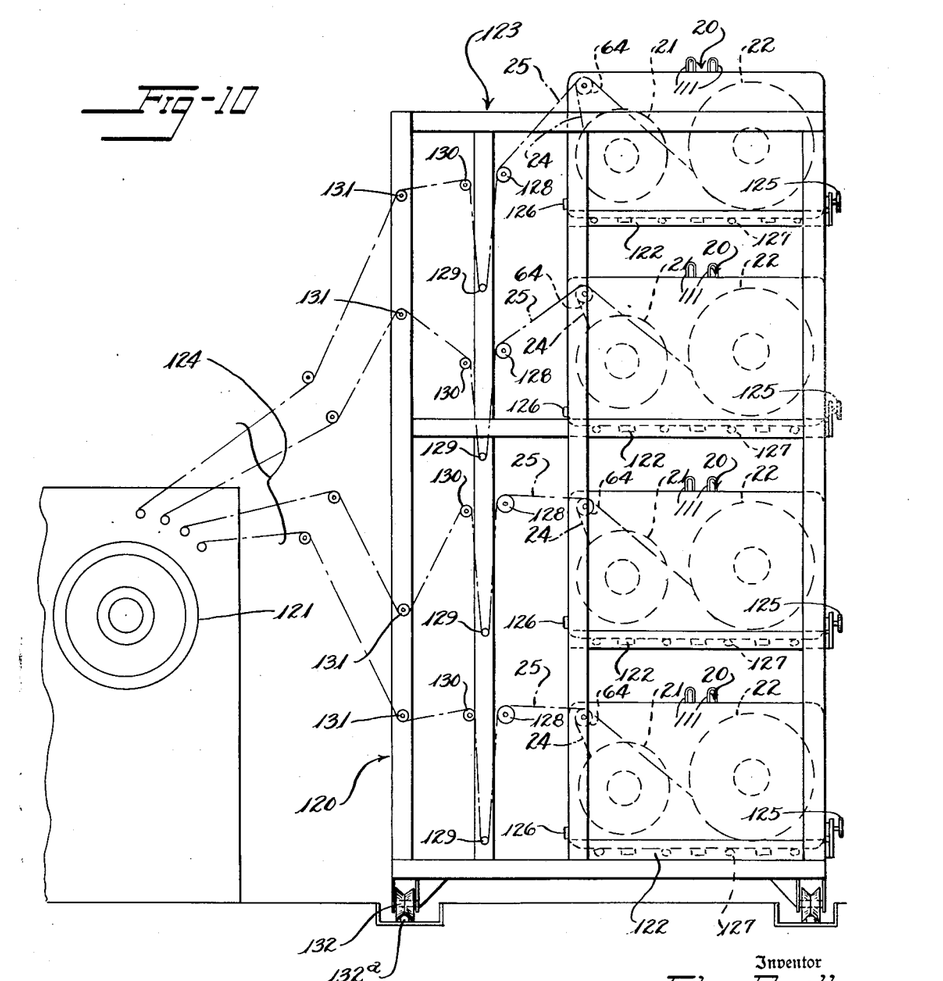
Figure 10 is a somewhat diagrammatic side elevation showing several units embodying the invention in readiness to deliver stock to a tire building machine.
Figure 11:
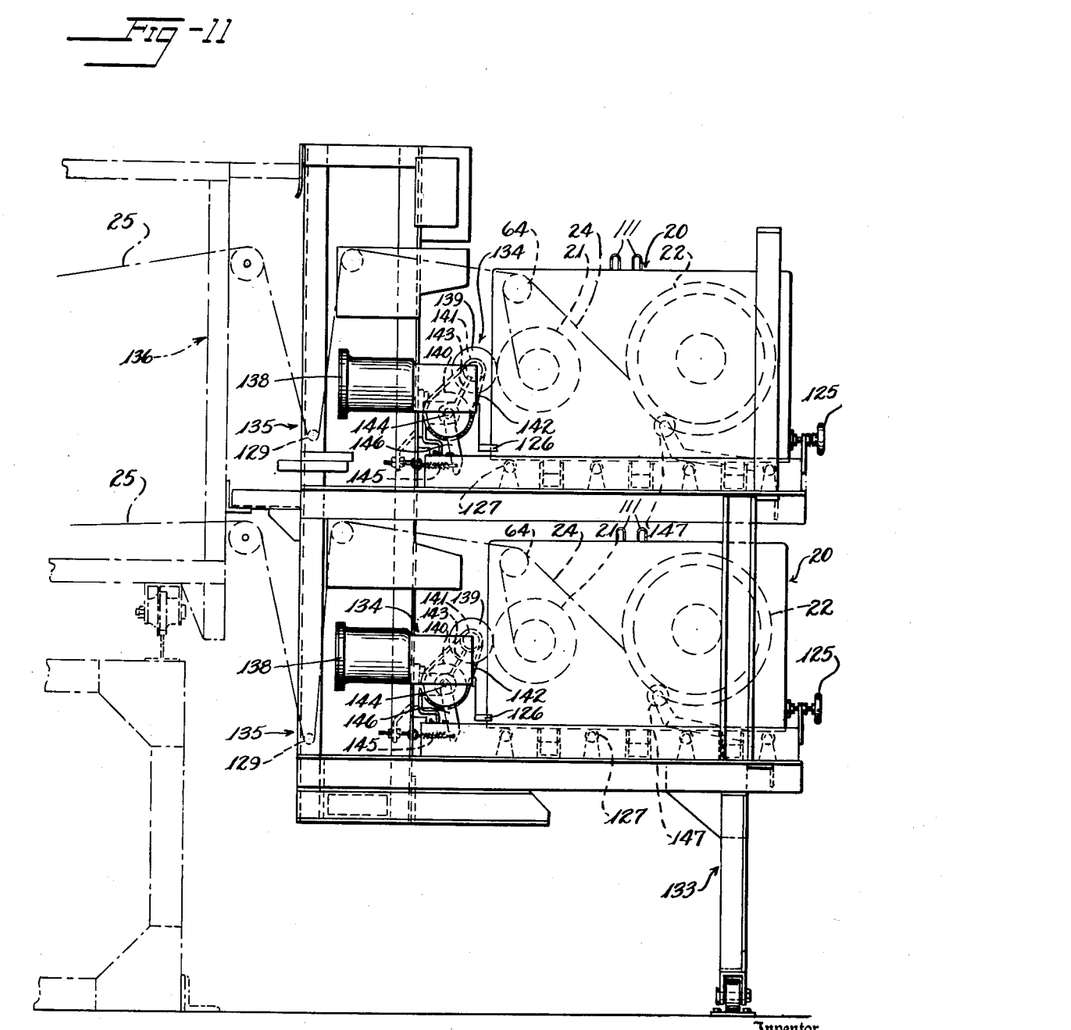
Figure 11 is a side elevation showing a plurality of units together with driving means and a modified delivery rack in position to deliver stock to a tire building machine.
Figure 12:
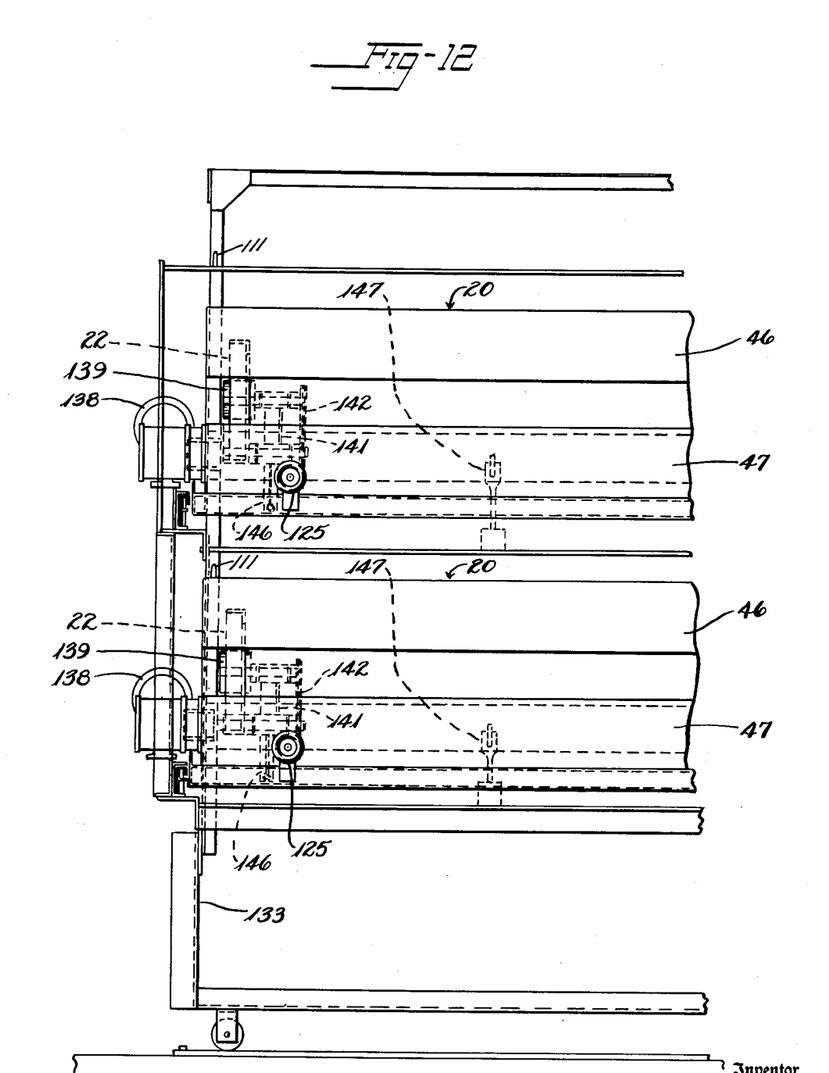
Figure 12 is an end elevation of the apparatus of Figure 11.

The manner in which the units are used in serving a tire building machine is illustrated diagrammatically in Figures 10–12 inclusive. As shown in Figure 10, a frame, indicated generally at 120, of suitable structural members is provided adjacent a tire building drum 121. The frame 120 is provided with shelves 122 adapted to receive sets of four delivery units 20, each of which is loaded with appropriate stock and each of which is capable of independent operation under the control of the tire builder. The stock is delivered successively from the units to a compensator, indicated generally at 123, and from there to the trays 124 from which the operator draws the stock.

In use, the loaded units are loaded in frame 120 by a fork lift truck and are locked in place so that the reels will be accurately positioned with respect to the building drum. The locking means comprises jack screws 125 which engage the rear of each unit and holds the unit firmly against a stop 126. Rollers 127 may be provided to move the units easily onto the shelves. Once positioned the stock can be delivered with accuracy, eliminating the use of guides. The reels are then driven in a direction to unload the stock, reel 21 being rotated counterclockwise by means not shown, and the reel 22 idling as the liner is pulled from it. The stock is festooned about the compensator rolls 128, 129, 130 and 131 before it reaches the trays 124.

In building a tire the operator draws the ply stock from the top tray and secures it to the drum. The building drum is then driven one revolution, being stopped either automatically or at the control of the operator, while simultaneously the unit supplying the stock is driven to feed the stock without subjecting it to excessive tension. The unit continues to be driven as long as its corresponding dancer roll 129 is lifted by the stock and stops only when the roll reaches its lower-most position. The operator, after splicing the ply on the drum, lifts the tray and takes the next ply from the next lower tray in the same manner. It will be noted that the operator need exert only a slight pull on the stock for the unit delivers the stock positively as fast as it is needed. When a unit is exhausted of stock it is replaced with a full unit and returned to the splicing table or other supply point for reloading.

The frame 120 is shown in side elevation as holding four units. In some cases, however, it is desirable to have eight units in the frame and as a result, the frame is doubled in capacity with two four-high tiers of units and is mounted so that the frame can be shifted laterally with respect to the drum to position first one set of units and then the other in feeding position. The frame may slide along ways, but it is preferred to provide wheels 132 on which the frame rolls along rails 132a. Suitable stops not shown may be provided to position the frame as a whole.

A modified form of delivery frame is shown in Figures 11 and 12. The frame which is indicated generally at 133 is adapted to hold four units in tiers of two, and like the frame 120 is mounted on rollers to be shifted laterally in order to bring the units alternately into position. Frame 133 comprises three sections, a unit and driving mechanism section 134, a compensator section 135, and a delivery tray section 136. The frame and associated units are intended to be used in the same manner as that of Figure 10, the tire builder taking the ply stock from the delivery trays as required.

The driving means shown in Figure 11 for unloading the units is similar in all essential respects to that shown in Figure 4, differing only in that it is adapted to engage reel 21 through a suitable aperture in the front wall of the unit. It comprises the motor 138 which drives a friction drive roll 139 through a chain and sprocket mechanism including sprockets 140 and 141 and chain 142. The roll is journalled on an arm 143 pivoted as at 144 about the axis of sprocket 140 and urged into contact with reel 21 by the spring 145 acting through lever arm 146. The motor 138, as noted above, is partially controlled by the position of dancer roll 129. It is also controlled by means indicated generally at 147 which is similar to the gauge 81 of Figure 2. Control 147 stops motor 138 when the supply of stock and liner on reel 22 reaches the end.

Although the discussion has been confined to the handling of ply stock in continuous lengths, it is to be understood that the stock can be cut to the required lengths for tire building and delivered by the units with equal effectiveness to the tire building machine. Tread ply stock, chafer strip stock, etc., as well as ply stock, can likewise be stored and delivered by the units. If desired, all of the stock required in the building of a tire may be stored in a single unit in such a manner that it will be delivered by the units in the proper lengths and in the proper sequence to eliminate much of the labor of the tire builder and greatly speed up production. In such a case a single unit will have stored in it a number of complete sets of stock material for building a corresponding number of tires.

It is also to be understood the driving means can be permanently associated with units, but this is not considered as economical as the detached drives which can be used successively for a number of units.

The invention has been described with particular reference to tire manufacture, but it is to be understood that this is by way of example and not by way of limitation. Various changes and modifications will occur to those skilled in the art without departing from the spirit and scope of the invention, the essential features of which are summarized in the following claim.

What is claimed is:

Apparatus for handling and storing lengths of flexible tire ply stock, comprising, in combination, a rigid frame positioned accurately with respect to a tire building drum, a separate portable unit having exterior supporting surfaces, and a pair of reels journaled in said unit with their axes accurately positioned with respect to said exterior surfaces and with a flexible liner of substantial length extending diagonally between the reels from one reel to the other, secured at its ends to said reels and adapted to store said ply stock in the convolutions of the liner wound on said reels, guiding means on said frame engageable with said exterior surfaces to receive and position said unit accurately with respect to said tire building drum and means to drive one of said reels to unwind said liner and to deliver said ply stock to said tire building drum.

References Cited in the file of this patent
UNITED STATES PATENTS

| | | |
|---|---|---|
| 1,737,127 | Richey | Nov. 26, 1929 |
| 1,952,904 | Bostwick | Mar. 27, 1934 |
| 1,957,518 | Woock | May 8, 1934 |
| 2,034,063 | Stacey | Mar. 17, 1936 |
| 2,045,534 | Stevens | June 23, 1936 |
| 2,066,891 | Larson et al. | Jan. 5, 1937 |
| 2,340,267 | Haase | Jan. 25, 1944 |
| 2,568,431 | Congdon | Sept. 18, 1951 |